(12) United States Patent
Geldbaugh (10) Patent No.: US 6,314,890 B1
(45) Date of Patent: Nov. 13, 2001

(54) DUAL USE TRANSPORTATION SYSTEM

(76) Inventor: G. Richard Geldbaugh, 230 Hendricks Isle, Ft. Lauderdale, FL (US) 33301

( * ) Notice: Subject to any disclaimer, the term of this patent is extended or adjusted under 35 U.S.C. 154(b) by 0 days.

(21) Appl. No.: 09/304,582

(22) Filed: May 4, 1999

Related U.S. Application Data

(60) Provisional application No. 60/084,275, filed on May 4, 1998.

(51) Int. Cl.⁷ .................................................. B61B 12/02
(52) U.S. Cl. ........................................ 104/242; 191/45 R
(58) Field of Search ..................................... 104/124, 125, 104/242, 243, 245, 248; 105/72.2; 191/29 R, 45 R, 48

(56) References Cited

U.S. PATENT DOCUMENTS

| | | | |
|---|---|---|---|
| 5,289,778 | * 3/1994 | Romine | 104/130 |
| 5,758,583 | * 6/1998 | Lohr | 105/72.2 |
| 5,845,583 | * 12/1998 | Jensen | 105/72.2 |
| 6,029,579 | * 2/2000 | Andre et al. | 105/72.2 |

* cited by examiner

Primary Examiner—S. Joseph Morano
Assistant Examiner—Robert J. McCarry, Jr.

(57) ABSTRACT

A dual use transportation system having a dual mode guideway infrastructure with guide rails, power and communication sources adjacent to a roadway surface and with dual use vehicles having a movable, detachable connector gear assembly that moves to extend outward from vehicle and connect to guiderails on the guideway for safe, high speed, guided and controlled captive vehicle movement; and further that connector gear detaches from rail system and connector gear retracts into body of vehicle, wherein vehicle then operates in a free roving conventional manner independent of guideway.

19 Claims, 5 Drawing Sheets

DUAL USE TRANSPORTATION SYSTEM

TECHNICAL REFERENCE

This invention relates to provisional patent filed on May 4, 1998, 60/084,275 titled TRANSBUS.

BACKGROUND

1. Field of Invention

This invention relates to a dual use transportation system utilizing dual use vehicles having a detachable, retractable connector gear which is utilized to connect a dual use vehicle to a dual use guide way rail system.

2. Description of Prior Art

In the past, bus ways and guide way light rail transit systems have had separate dedicated infrastructures. For the captured vehicles moving on the light rail transit system, a section of the guide way is typically only used for twenty seconds every eleven to fifteen minutes. The rest of the time, the expensive guide way is not utilized.

DISCLOSURE OF INVENTION

With the new invention, the expensive guide way can have dual modal use. The captured vehicles of the transit system can utilize the system as they conventionally function and dual use vehicles, such as buses, can utilize the guide way between the transit use.

The dual use vehicles can enter onto the guide way through safety control gated rampways and with the connector gear can quickly connect to the guide rail system. The dual use vehicles then function like a captured vehicle of the transit system. The dual use vehicles can then quickly detach from the guide way and drive off the guide way to function as conventional street vehicles.

BRIEF DESCRIPTION OF DRAWINGS

FIG. 2 Shows cross section of elevated guide way, having a dual use vehicle connected to the central control beam on one side and a transit vehicle on the opposite side FIG. 3 Shows a cross section through a dual use vehicle, with the retractable connector gear withdrawn into the dual use vehicle profile FIG. 4 Shows a cross section of the dual use vehicle and the guide way structure, with retractable connector gear extended and flanged wheels free between rails FIG. 5 Shows a cross section of the dual use vehicle and guide way structure, with retractable connector gear extended and flanged wheels connected to the fails FIG. 6 Shows a side view of the wheels assembly, in expanded vertical placement FIG. 7 Shows a side view of the wheel assembly, in contracted vertical placement FIG. 8 Shows a section view through the wheel assembly and the pivotable support frame FIG. 8A Shows a side view of the wheel assembly and the pivotable support frame FIG. 9 Shows a side view of the retractable connector gear in an extended position FIG. 10 Shows a cross section of the center control beam structure and components FIG. 11 Shows in side view, alternative wheel configuration and movement devices FIG. 11A Shows in side view, alternative wheel configuration and movement devices FIG. 12 Shows cross section of guide way, with common guide rail, mounted to the web of the central control beam with a dual use vehicle on one side and a transit vehicle on opposite side FIG. 13 Shows a cross section of guide way, with a common guide rail, mounted to the road way FIG. 14 Shows a plan view of the dual use vehicle and the web of the central control beam, illustrating power and communication device connectors FIG. 15 Shows a plan view of the dual use vehicle and the web of the central control beam, having steering device mechanisms FIG. 16 Shows a plan view of the dual use vehicle and the web of the central control beam, having sensor devices to control steering of the vehicle

DESCRIPTION OF DRAWINGS

Figure 1:
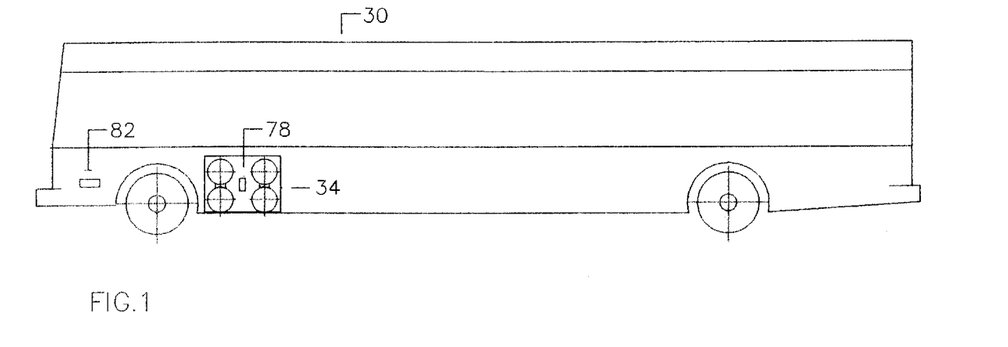
FIG. 1 Shows a dual use vehicle in side view, with retractable connector gear

FIG. 1 Shows a side view of a dual use vehicle 30, wherein the retractable connector gear 34 is recessed into the side of the vehicle. The retractable gear 34 is positioned near the front wheels of the vehicle. The gear, when retracted within the vehicle structure, is compacted in the vertical height between the attachment wheels. A recess is provided in the side of the vehicle structure to accommodate the retractable gear 34. Also illustrated are the power and communication connector interfaces 78 which telescope outward with the retractable gear and connect to sources 44 provided on the guide way.

A steering control guidance sensor device 82 is also located adjacent to the front wheel of the vehicle. The guidance sensor device senses the dimension between the vehicle and the guide way and sends data to a steering control mechanism 80, which steers the vehicle parallel to the guide way.

Figures 2, 3:
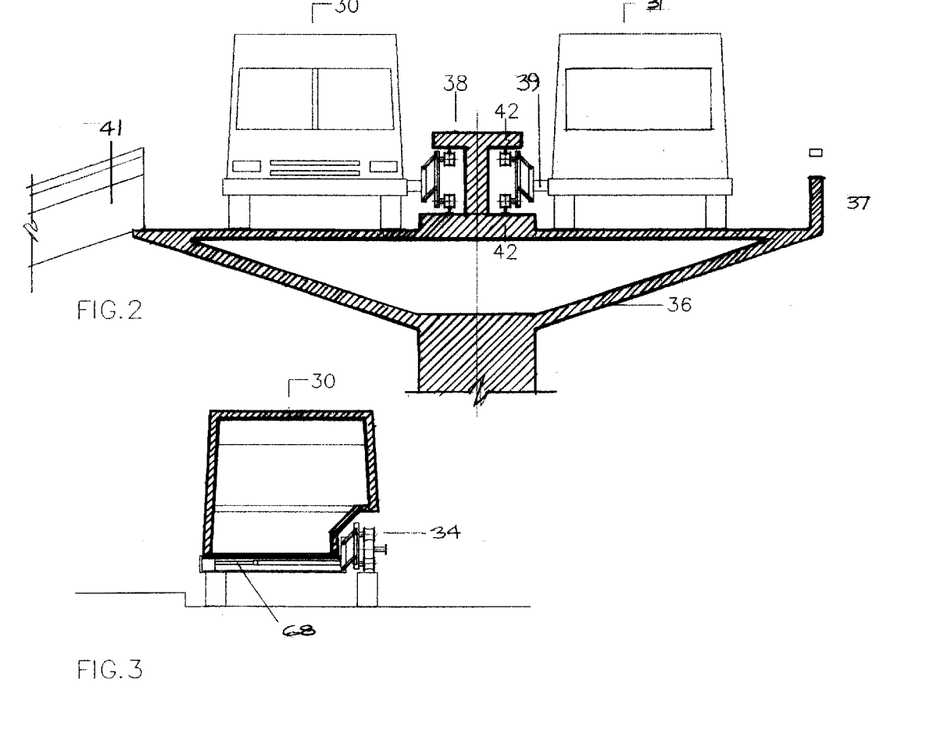

FIG. 2 Shows dual use vehicle 30 and a transit vehicle 31 positioned on an elevated guide way 36. The guide way is double-sided with vehicles traveling on both sides of the central control beam 38. The central control beam 38 is configured in an "I" shape and has a vertical height between the structural flanges, enough to accommodate bearing rails 42, flanged wheels 46, 50 communication and power provisions 44. The control beam 38 provides the structural stability for the rail 42 assembly.

Protruding from the sides of the dual use vehicle 30 are retractable connector gear 34 which have suspension systems, 58,62 pivotal frames 54 and adjustable flange wheel assemblies 46,50. The flanged wheel assemblies are shown in their extended position, contacting the rail 42 surfaces on the top and bottom flange of the control beam 38. The drawing illustrates how the dual use vehicle 30 can be securely connected to the guide way 36. The transit connector gear 39 can be locked into position and only removed from rails for servicing or change of location. Also shown is a rampway system 41 for egress and exit from road surface 33 of guide way 36.

FIG. 3 Shows a cross section through the dual use vehicle 30 with the retractable connector gear 34 retracted into the profile of the dual use vehicle. The horizontal support framework 68 is shown supporting the retractable connector gear 34. A connector member movement means, such as a hydraulic ram system, facilitates the movement of the detachable gear within the horizontal supporting structure.

The entire retractable gear 34 assembly can be retrofitted into existing bus structures, wherein horizontal support frame would be supported to the underside of the bus chassis. Recess areas are cut into the side of the bus structure and a reinforced housing is installed to provide continuity of structure to the bus framework.

Figure 4:
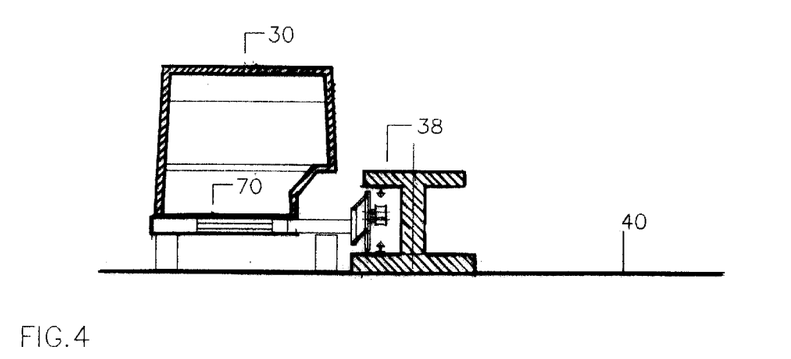

FIG. 4 Shows a cross section through a dual use vehicle 30, wherein the retractable connector gear 34 has been telescoped outward to a position where the flanged wheels 46,50 are in alignment with the rails 42 mounted to the support beam. A connector member movement means 70, such as hydraulic rams, have pressed the retractable gear 34 horizontally within the transverse supporting members. The extended flange wheels 46,50 have a vertical overall dimension less than the vertical dimension between the surfaces of the upper first and lower second rails attached to the guide way. The flanged wheels 46, 50 in their reduced overall dimension provide clear extension of the wheels horizontally between the guide rails 42 prior to attaching to the rails 42. Also shown is the vehicle structural frame 35.

Figure 5:
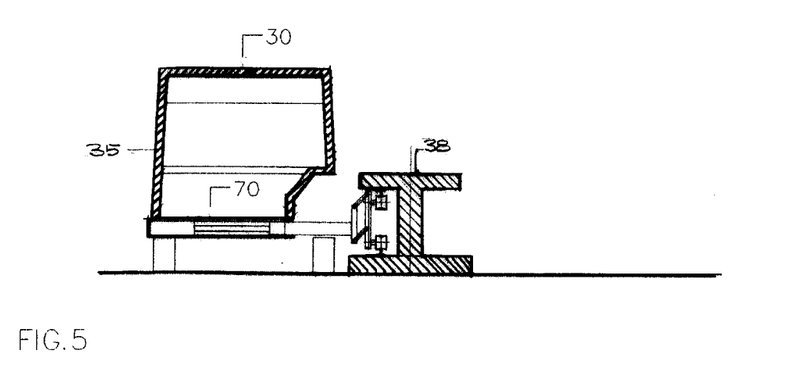

FIG. 5 Shows a cross section of the dual use vehicle 30, wherein the retractable connector gear has telescoped horizontally, hence the flanged wheels 46,50 are in alignment with the guide way rails 42. The dimension between the flanged wheels 46,50 is expanded vertically to bring the flanged wheels 46, 50 in contact with the support rails 42. The upper first flange wheel 46 has it's vertical plane closest to the guide way, extended in overall diameter, therefore the engaged wheel locks behind the web side of the upper first rail 42 member. The vehicle side of the upper flanged wheel 46 is of a smaller overall diameter than the side of the wheel adjacent to the web.

The lower second flanged wheel 50 side, adjacent to the vehicle, has an extended diameter to the flange which contacts the vehicle side of the lower support rails 42. The side of the lower second flange, adjacent to the web, is a smaller diameter than the flange adjacent to the vehicle. The flanged wheels 46,50 in their extended vertical position lock into place about the upper and lower rails 42 and can connect the flange wheels to the rails.

Figure 6:
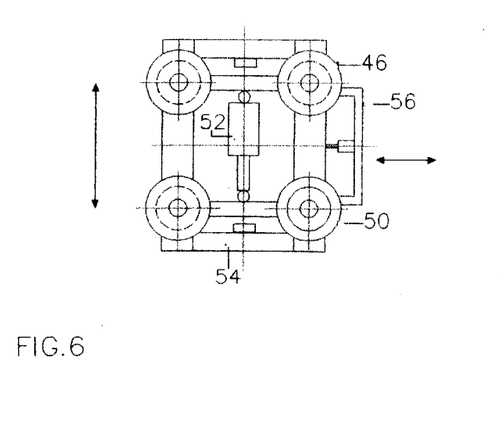

FIG. 6 Shows a side view of the flanged wheel assembly in vertical expanded position, wherein the wheels are connected to a pivotable support frame 54. A connector wheel movement means 52, such as hydraulic cylinders, move the flanged wheels 46, 50 so the vertical dimension between the wheels 46,50 can be expanded or contracted. This process provides for connecting the flanged wheels 46, 50 to the support rails on the guide way.

When the distance between the flanged wheel is expanded to it's maximum extended dimension, a locking device 46 holds the wheels securely in the expanded position until the lock is released. The locking device 46 provides securing the flange wheels to the tracks in a reliably secure manner.

Figure 7:
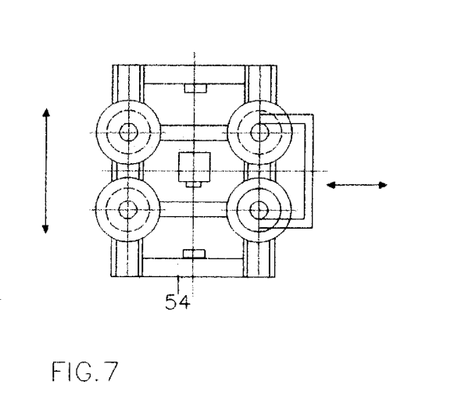

FIG. 7 Shows the flange wheels attached to a pivotable support frame 54. The frame has a univeral joint means 55, such as a pivoting connector, providing connection of the support member 54 to the retractable gear suspension system's outer frame 58. The pivoting action allows the pivotal support frame 54 to have a range of motion in the horizontal plane. This range of motion enables the retractable gear 34 to follow parallel to the guide way control beam 38.

Figure 8:
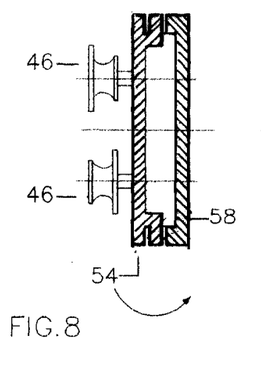

FIG. 8 Shows a cross section view of the outer suspension frame 58 with pivotal connector means 55 in a vertical axis, connecting to the connector wheel support frame 54. The different wheel flange diameters and the location of larger flange diameter are shown for the upper first 46 and lower second wheels 50.

Figure 8A:
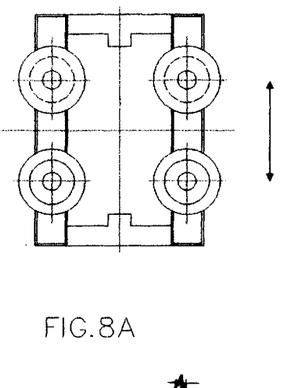

FIG. 8A Shows a side view of the wheel assemblies 46, 50 connected to a pivotable wheel support frame 54.

Figure 9:
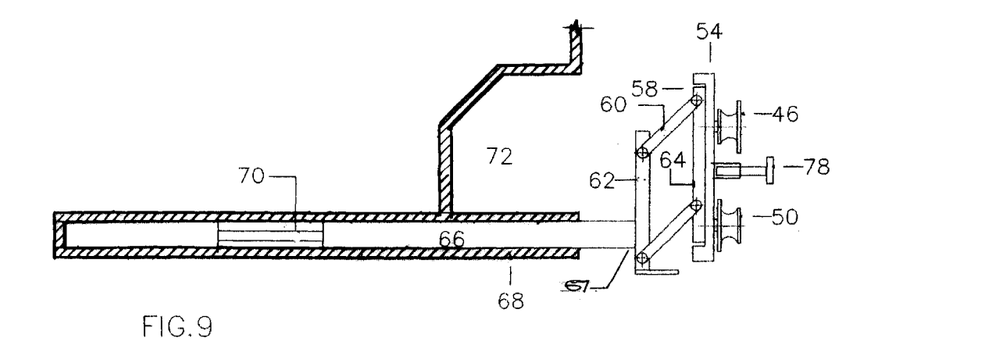

FIG. 9 Shows a larger scale cross section view of the retractable connector gear 34, wherein a connector member movement means 70, such as a hydraulic ram, extends the retractable gear 34 horizontally within the horizontal support members 68. Connected to the horizontal projecting frames 68 outer end 67 is an inward side 62 vertical suspension structure to which pivotally dual arm 60 suspension system connects. The outward side ends 58 of the suspension system 59 connect to an outer suspension 58 structure that is in turn connected by a vertical pivotal connector means 55 to the connector wheel support frame 54. Connected to the rotating wheel assembly support structure 54 are the flanged wheels 46, 50 which can move in the vertical plane along the wheel assembly support structure 54.

Telescoping from the wheel assembly support structure 54 are the connector arms for the power and communication pick up interfaces 78. Between the suspension arms 60, a shock dampening mechanism is provided which attaches to the opposing sides of the suspension system 60.

The retractable gear assembly 34 provides the following: Extension of the assembly in the horizontal plane; provides vertical accommodations between the vehicle 30 and the fixed guide way 46; provides lateral rotation movements to keep vehicle 30 parallel to guide way 46; provides vertical movement of flanged wheels 46, 50 to interface with guide way rails 42 and lock into position; provides telescoping power and communications connections 78; provides the entire assembly 34 to be retracted in size and withdrawn into a space within the profile of the dual use vehicle 30.

Figure 10:
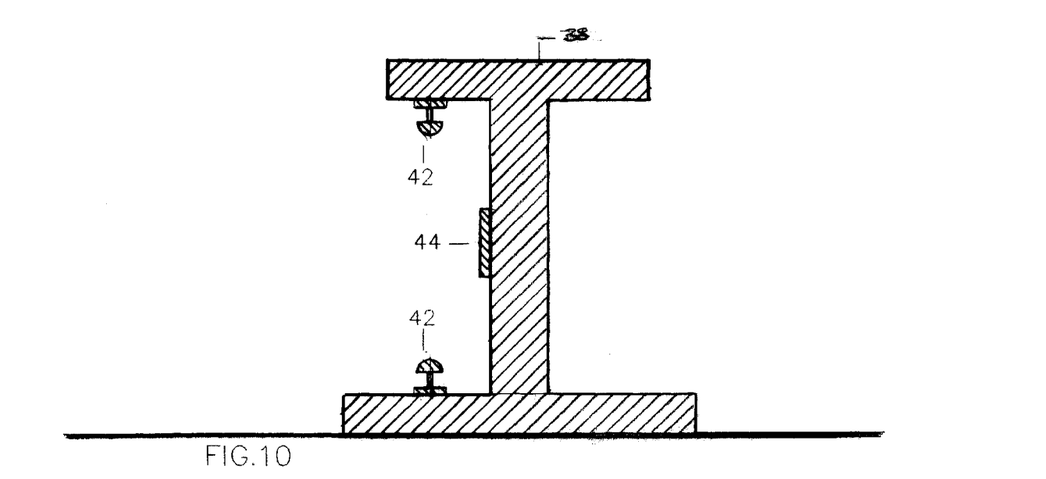

FIG. 10 Shows a cross section through the guideway structural central control beam 38, wherein guide rails 42 are mounted to the upward facing bottom flange and the downward facing top flange of the control beam 38 section. Mounted on the structural vertical web-section of the control beam 38 are the electrical power source 44, the auxiliary electrical power sources 44 and the communication system primary connections 44. The rails are protected by the shape of the beam structure and are raised above the surface on which the dual use vehicle 30 wheels run. The electrical and communication system primaries 44 are located in a protected area and are easily serviced. By having all primary guide way facilities housed within the shape of the control beam 38, the roadway surface 33 on which the dual use vehicle 30 runs is free and clear of all encumbrances. By having the primary functions off the roadway surface 33, maintenance, such as snow plowing and other weather-related maintenance conditions, are made easier to accomplish.

Figure 11:
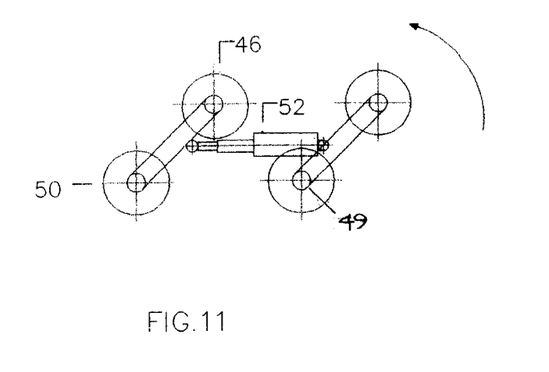
Figure 11A:
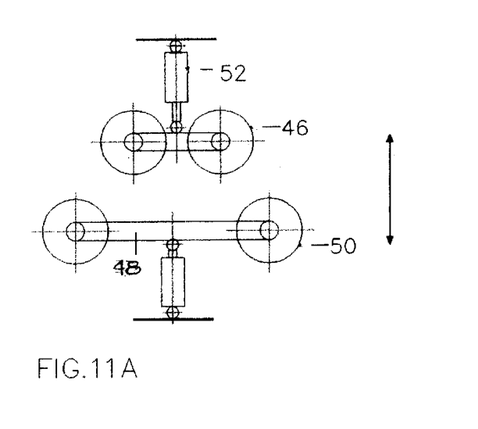

FIG. 11 Shows a side view of flanged wheel assembly 46, 50 connected by a tie member 48 in which the vertical off set between the axle of the wheels is increased by rotating the wheels about a pivot point 49 from an angled position to a vertical position. There are other configurations that can be utilized to accomplish increasing the vertical distance between the axle of the flanged wheels, however for this submission, the technique of direct vertical movement of the wheel to increase the distances between the axle is utilized.

Figure 12:
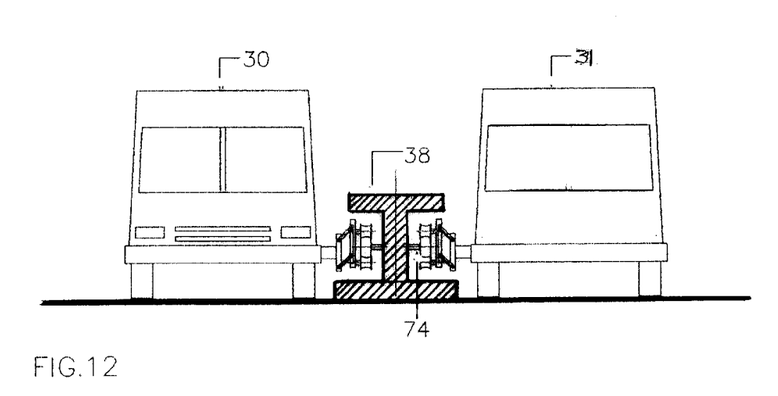

FIG. 12 Shows a cross section through the guide way control beam in which a common rail 74 is mounted to the web section of the structure. The rail 74 has an elongated vertical profile so that flanged wheels 46,50 can attach to the top surface of the rail 74 and to the bottom of the rail 74. In this alternative method, the retractable connector gear 34 is extended and the flanged wheels 46, 50 clear the top and bottom of the common guide rail 74. Once the flanged wheels 46, 50 are in alignment with the guide rail 74, the wheel assemblies close together and connect to the top and bottom surfaces of the guide rail 74. The system can be utilized for the dual use vehicle 30 and the light rail transit vehicle 31.

Figure 13:
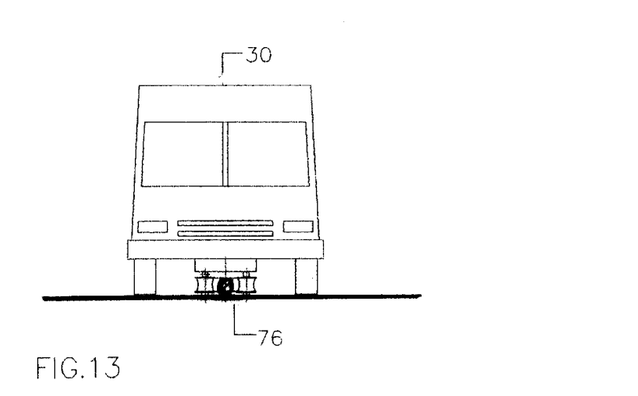

FIG. 13 Shows a front view of a dual use vehicle 30 with a common guide rail 76 mounted to the road surface 33 on which the dual use vehicle 30 runs. In this alternative method, the retractable connector gear 34 moves in a vertical direction as opposed to a horizontal direction and aligns with the common guide rail 76. Once in alignment, the assembly 34 attaches to the rail 76 as described in FIG. 12.

Figure 14:
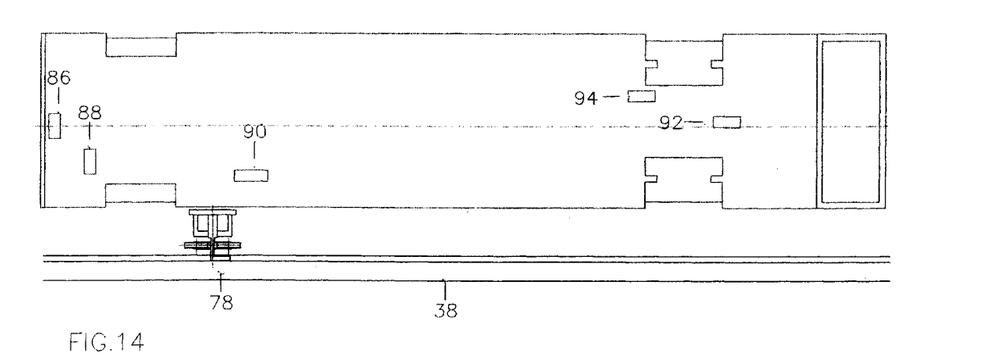

FIG. 14 Shows a plan view of the dual use vehicle 30 or transit vehicle 31 with the retractable connector gear extended to the control beam structure 38. Telescoping from the retractable gear are contact pick up interface 78 devices which connect to the primary sources for electrical, auxiliary and communications power 44 which are then conveyed to the dual use vehicle 30 or the transit vehicle 31. From the primary power source, energy is derived to propel the vehicle 30, 31 and energy is supplied to re-charging batteries within the vehicle. The dual use vehicle 30 operates on battery-stored energy when not connected to the guide way. Auxiliary electrical is furnished to the vehicle for all other support activities. Acceleration functions are governed so that the speed of the vehicle is controlled by the overall transit system.

From the communication lines, the vehicle 30,31 is attached to a central computer system which monitors all functions of the vehicle 30,31 when it is attached to the guide way. Through this communication system, the speed, braking speed and distances between this vehicle and other vehicles on the rails 42 is all controlled. The dual use vehicle 30 has designated areas to connect and disconnect from the guide way 36.

Figure 15:
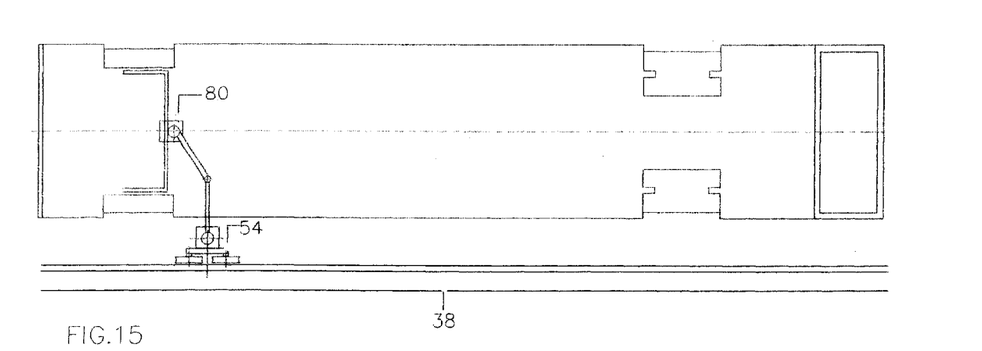

FIG. 15 Shows a plan view of the dual use vehicle 30 having a steering mechanism connected to the pivotal wheel support frame. As the pivotable wheels support frame 54 pivots, the movement is translated through the linkage of rod and coupling assemblies to a power assisted steering coordination module 80 which is connected to the steering system 81 of the dual use vehicle 30. The steering is activated, then the retractable steering gear 34 is connected to the guide way 36.

Figure 16:
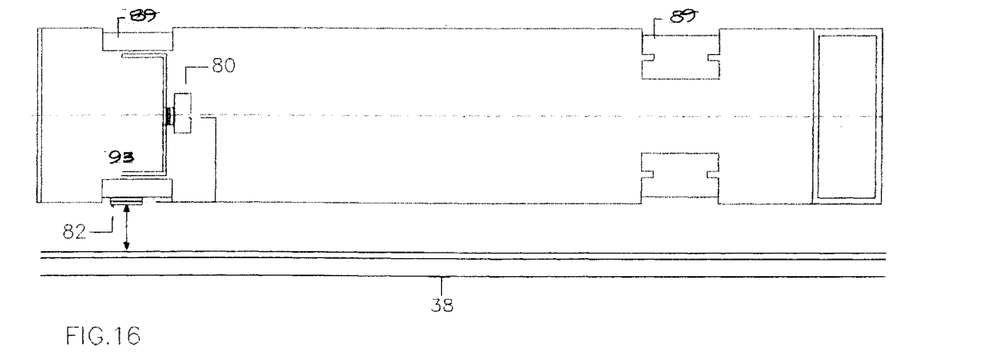

FIG. 16 Shows a plan view of the dual use vehicle 30, having sensor element services 82 to control the steering system 81 of the vehicle. Mounted to the side of the vehicle 30 by the front wheel adjacent to the control beam 38 is a sensor device 82 which gauges the distance between the vehicle 30 and the control beam 38. The sensor 82 is extremely sensitive and can detect the slightest change in the distance. The sensor can operate by various modes, such as light beams, sound waves, lasers, etc. This minute change in distance data is communicated to a power assisted coordinated steering means 80 system. The sensor steering is activated when the dual use vehicle 30 is connected to the guide way 36. Also shown are vehicle wheel movement means 89, vehicle propulsion system 91 and vehicle steering system 93.

Best Mode

In the best mode of the operation of the dual use transportation system, a dual mode guide way infrastructure is utilized by the dual use vehicle, which operates in part as a typical bus, circulating streets, picking up and delivering passengers. The typical dual use vehicle, as a minimum, would have a structural frame, a wheeled movement system, a propulsion system, a braking system, a steering system and a retractable connector gear assembly.

The unique functions of the dual use vehicle 30 come into play as the dual use vehicle is connected to and uses a dual use guide way 36, quickly moving passengers picked up in one location to another location via the guide way and then re-distributes them in the new areas, using conventional road ways. The system substantially reduces the transfer process and greatly reduces traffic congestion and pollution.

Passengers being picked up in an area, can utilize a reservation and demand call system, which computer routes the pick-up points as well as destination points.

Once passengers are picked up from street routes, the dual use vehicle 30 proceeds to the dual mode guide way 36. Along the guide way are safety rails 37 and gated exit and egress rampways 41 for the dual use vehicle 30 to enter and exit the guide way road surface 33. The on-board computer correlates with the prime transit system control. As the dual use vehicle 30enters the gate area, coding information is sent to the prime transit system control.

Within the designated time frame, the control gate raises and the dual use vehicle 30 is driven onto the transit system roadway 33, positioning itself adjacent and parallel to the guide rail 42. On-board steering aids assist the driver into the connecting position. The retractable connector gear assembly 34 extends from the dual use vehicle 30 and the flange wheels 46, 50 align with the guide rails 42. The flange of the lower second wheels 50 contact the face of the lower second rail, adjacent to the dual use vehicle 30. The wheel assembly pivots to positively contract both lower wheels and aligns the wheel assembly to the rails 42.

With the wheels in alignment between the upper first and lower second rails 42, the connector wheel movement means 52, such as a hydraulic piston, expands the vertical distance between the axles of the upper 46 and lower wheels 50. The flanged wheels are extended to interface with the shape of the rails 42 and are connected to the rails 42 by the flanges.

The lower second wheel 50 has a greater flange diameter on the side adjacent to the dual use vehicle 30 and a lesser flange dimension on the side of the wheel adjacent to the control beam 38.

The upper first wheel 46 has a greater flange diameter on the wheel side, adjacent to the web of the control beam 38 and a lesser flange diameter on the side adjacent to the dual use vehicle 30.

The combination of the wheel flange diameter and connector wheel movement means interlock the wheels 46, 50 to the rails 42. After the wheels have interfaced with the rails, a locking device 56 has portions of its structure which fit to the wheel assembly to positively lock the wheels 46, 50 in position.

A driver's control device, coupled with sensor information from the transit central control, release the lock, allowing the wheel assembly 46, 50 to be detached from the rails 42.

With the flanged wheels 46, 50 attached to the rails 42, the wheel assemblies guide along the path of the rails 42.

As the rails 42 turn in the horizontal plane, the connector wheel support frame 54 pivots. The pivoting action of the frame transfers, by steering coordination means 80, to the steering gear 93 of the dual use vehicle, keeping the vehicle in parallel alignment with the guide rails 42.

Telescoping outward from the retractable connector gear 34 towards the central control beam 38 web, electrical power and communication interface devices 78 extend and interface with power and communication sources 44 mounted to the beam web.

From the power source 44, electrical energy is derived to power the electrical motors on the vehicle and to re-charge the battery 89 on board the dual use vehicle 30.

Auxiliary power is supplied to power the additional equipment on board the dual use vehicle 30.

From the communications source 44, complete data is conveyed to the dual use vehicle 30 to control all of its functions while on the dual mode guide way 36. This data is processed by on board computer 90 and is directly connected to governing devices 92 which regulate the speed by acceleration and braking of the vehicle 30. On board radar regulates the distance between the dual use vehicle 30 and other vehicles of the guide way 36.

Once the dual use vehicle 30 has reached it's destination get-off gate, the vehicle is slowed down. The sensors on the guide way signals the lock to release, the upper wheels 46 retract downward vertically to clear the top rail 42, the lower wheels 50 raise upward vertically to clear the flange on the web side to be above the rail 42;

Information signals on the driver's module 88 instruct driving the dual use vehicle 30 manually away from the central control beam 38 and exit off the guide way 36 by the exit rampway 41.

Once disengaged from the rails 42, the retractable connector gear 34 retracts horizontally back into the compartment within the profile of the dual use vehicle 30.

After leaving the guide way 36, the electric dual use vehicle is powered by energy supplied by battery systems 84. The dual use vehicle 30 enters streets and circulates to distribute and receive passengers.

People living in one area of town can be picked up in their neighborhoods and be delivered to their workplace in a distant section of town without having to make a transfer.

The system provides circulation of vehicles in the areas where the people live or work and pick them up and connect them to a high speed guide way infrastructure.

The dual use vehicle 30 detachable connector gear 34 provides connection to the guide way without elaborate and costly switching gear.

The dual use vehicle 30 can enter and exit the guide way by egress and exit rampways 41 that are gate system controlled. The expensive transit station facilities can be serviced by the dual use vehicle 30, however the stations are not necessary for the dual use vehicle 30 to utilize the transit system guide way 36.

The dual use vehicle 30, utilizing the horizontal retractable connector gear 34, can have all of the control guide rails 42 and power and communications sources 44 mounted on the central control beam 38, thereby leaving the roadway surfaces 33 unencumbered to drive across the roadway and to servicing the roadway for ice and snow removal.

The rails 42, power and communication sources 44 are protected from the elements within the shape of the control beam 38.

The dual use vehicles 30 retractable connector gear 34 can be retrofitted to other vehicles, such as existing buses. The support frame 68 for the gear 34 can be mounted to the underside of an existing bus chassis. The recessed compartment for the gear can be worked into the existing bus side wall framing, to provide structural continuity.

As an alternative, the guide rail can be a common rail 74, mounted to the web of the control beam 38. The flanged wheels 46, 50 would connect to the upper and lower surfaces of the common rail 38.

As another alternative, the common guide rail 76 can be mounted to the roadway surface. The retractable gear would raise and lower vertically to align with the guide way. The flange wheels would move horizontally toward each other to connect to the outside of the common guide rail 76.

The roadway surfaces 33 for the dual use vehicle 30 are wide enough to provide the exit passage way along the curbside of the vehicle.

As an alternative steering system, a sensor element 82 could be mounted to the dual use vehicle 30 adjacent to the front wheels of the bus. The sensor would sense the distance between the vehicle 30 and the control beam 38 surface or activated material on the beam's surface.

The sensor data is conveyed to a steering coordination means 80 connected to the vehicle's steering system 93. The sensor data and the steering device steer the vehicle parallel to the guide rails.

The buses that are retrofitted for the dual use vehicle retractable gear could be diesel powered.

The dual mode guide way infrastructure 36 can be for a transit system that is patented in which the trucks for the transit system run on the rails in the center control beam and the vehicle 31 runs on the roadway.

The retractable guide way gear 34 has a horizontal support frame 68 which runs transverse to the longitudinal frame of the vehicle 30.

Within the horizontal support frame 68, a transversing connector member system 66 can slide and extend from the side of the vehicle. A connector movement member means 70, such as a hydraulic cylinder, forces the extending frame to slide in a protracting and extending movement.

The extending frame's outward end 67 connects to an inward vertical suspension frame 62 from which suspension arms 60 are pivotally connected. Also to the vertical frame, as shock dampening device is mounted.

On the other end of the suspension arms and shock dampening device, the members are pivotally connected to an outward vertical suspension frame 58.

The suspension and shock dampening devices provide variances in the vertical plane of the vehicle 30 in relation to the rails 42 on the guide way 36.

Formed into the center of the outward side of suspension frame 58 is a pivotal connector means 55 which provides for movement about a vertical axis.

Pivotally connected to the outward suspension frame 58 is a pivotable connector wheel support frame 54.

The pivotable connector support frame 54 provides for horizontal variances between the parallel alignment of the vehicle 30 and the rails 34 on the guide way 36.

The dual use vehicle 30 can operate on pneumatic tires and the connector wheel assemblies can have metal connector wheels that rollingly engage on metal guide rails.

The dual use vehicle 30 with the retractable connector gear 34 can be used for vehicles other than buses. Cars, vans and other types of vehicles can use the retractable connector gear 34 and connect to dedicated guide way 36 systems.

The dual use vehicle 30 process provides dual use of the guide way system 36. The expensive guide way structure can be utilized for light rail transit vehicles 31 servicing stations along the guide way 36 route. When a portion of the guide way 36 is not being used by the transit vehicles 31, dual use vehicles 30 can utilize the guide way 31.

It should now be apparent that the dual use transportation system described above possesses unique attributes as set forth in the best mode summary of the invention. Because the system can be modified to some degree without depart-

Numeral Index

30 Dual use Vehicle
31 Transit Vehicle
32 Guide way
33 Guide way Road Surface
34 RetractableConnector Gear
35 Vehicle Frame
36 Guide way Structure
37 Safety Rails
38 Central Control Beam
39 Transit Control Gear
40 Guide way Road Surface
41 Exit and Egress Rampways
42 Guide Rails
44 Power and Communication Distribution System
46 First Wheel Assembly
48 Tie Member
50 Second Wheel Asembly
52 Connector Wheel Movement Means
54 Pivotable Wheel Support Frame
55 Pivotal Connector Means
56 Locking Device
58 Outward side of Suspension
59 Suspension System
60 Suspension Arms
62 Inward side of Suspension
64 Shock Dampening Device
66 Transversing Connector Member System
67 Outward end of Frame
68 Horizontal Support Frame
70 Connector Member Movement Means
72 Recessed Compartment In Vehicle
74 Common Rail Mounted To Central Beam Web
76 Common Rail Mounted To Roadway
78 Communication And Power Pick-Up Interface Device
80 Steering Coordination Means
82 Sensor Element
84 Storage Battery
86 Radar Spacing Distance Control Device
88 Driver Interface Module
89 Vehicle Wheel Movement Means
90 On Board Computer Control Module
91 Vehicle Propulsion System
92 Acceleration Control Device (Governor)
93 Vehicle Steering System
94 Vehicle Braking System

What is claimed is:

1. A dual use transportation system comprising a dual mode guide way infrastructure having a roadway, a safety side structure, a egress rampway system, a exit rampway system with said guide way having a support structure adjacent to said roadway for a guide rail system, an energy power source, a communication system and further that said transportation system has, by at least one, a vehicle with wheels rolling engaged on said roadway surface and attached to said adjacent guide rail system, said energy source, said communication system in one mode, and further, in a second mode, by at least one, a dual use vehicle having wheels rollingly engaged with said roadway and with said dual use vehicle entering said guideway by said egress rampway and laterally driving across said roadway and detachable connecting to said adjacent guide rail system, said energy source, said communication system and at selected location detaching from said adjacent guide rail system, said energy source, said communication source system and driving off said dual mode guide way by said exit rampway as an independent vehicle.

2. A dual use transportation system as of claim 1, wherein said dual use vehicle has a structural frame, a wheeled movement system, a propulsion system, a braking system, a steering system, a retractable connector gear assembly.

3. A dual use transportation system as of claim 2, wherein said connector gear assembly has a support frame, a transversing connector member system, a connector member movement means, a suspension system, a connector wheel means, a universal joint means, a connector first wheel system, a connector second wheel system, a connector wheel movement means, an electrical interface means, a communication interface means, a steering coordination means, wherein said connector gear assembly support frame is mounted to said vehicle and said transversing connector member system moves to extend outward from said vehicle by said connector member movement means with the outward end of said connector member joined to inward side of said suspension system and outward side of said suspension system joined by said universal joints means to said connector wheel support frame with said connector first wheel assembly and said connector second wheel assembly mounted to said support frame so that the distance between said wheel assemblies can to increased or decreased by said connector wheel movement means, wherein said connector wheel systems aligns with said guide rails and said connector wheels are moved by said connector wheel movement means to rollingly engage said guide rails, placing said connector gear support frame parallel to said guide rails and from said support frame said electric interface and said communications interface extent outward to engage said energy source system and said communications system running parallel to said guide rails, wherein said connector support frame also connects to said steering coordination means that connects to said dual use vehicle's steering system directing said dual use vehicle to stay parallel to said guide rails.

4. A dual use transportation system as of claim 2, wherein said dual use vehicle propulsion system and said dual use vehicle braking system have a governing means that interface with said guide way communication system to regulate the speed and movement of the said dual use vehicle.

5. A dual use transportation system as of claim 2, wherein said dual use vehicle receives energy for propulsion from said energy source running parallel to said guide rails while said dual use vehicle is attached to said guide rails.

6. A dual use transportation system as of claim 2, wherein said dual use vehicle with said wheeled movement system has pneumatic tires and said dual use vehicle is guided by metal connector wheels rollingly engaged on metal said guide rails.

7. A dual use transportation system, comprising of a dual mode guide way infrastructure with a support structure for a guide rail system, an energy power source, a communication system adjacent to a even profiled roadway with said guide way also having a side safety structure, an egress rampway, an exit rampway system, and further with said transportation system having in one mode, at least one, a vehicle attached to adjacent said guide rail system, said energy source, said communication source with said vehicle having a pattern of wheels rolling engaged with said roadway and said vehicle operated in a guided pattern of movement and further in a second mode, by at least one, a dual use vehicle having an independent operating means and a pattern of wheels rolling engaging with said roadway and with said dual use vehicle entering said dual use guide way by said egress rampway and laterally driving across said roadway and detachable connecting to adjacent said guide rails, said energy source, said communication system, and at a determined location detaching from said guide rails, said energy system, said communication system and driving off of said guide way by said exit rampway.

8. A dual use transportation system, as of claim 7, wherein said dual use vehicle has a structural frame, a wheeled movement system, a propulsion system, a braking system, a steering system and a retractable connecting gear assembly having a support frame, a connector member movement means, a suspension system, a connector wheel support frame, a universal joint means, a connector first wheel assembly, a connector second wheel assembly, a connector wheel movement means, an electrical interface means, a communication interface means, a steering coordination means, wherein said retactable connecting gear support frame is mounted to said vehicle and said transversing connector member system moves to extend outward from said vehicle by said connector member movement means with the outward end of said connector member movement means joined to the inward side of said suspension system and the outward side of said suspension system joined by said universal joints means to said connector wheel support frame with said connector first wheel assembly and said connector second wheel assembly mounted to said support frame so that the distance between said wheel assemblies can to increased or decreased by said connector wheel movement means, wherein said connector wheel assemblies align with said guide rails and said connector wheels are moved by said connector wheel movement means to rollingly engage said guide rails placing said connector gear support frame parallel to said guide rails, and from said support frame said electric interface and said communications interface extend outward to engage said energy source system and said communications system running parallel to said guide rails, wherein said connector support frame also connects to said steering coordination means that connects to said dual use vehicles steering system directing said dual use vehicle to stay parallel to said guide rails.

9. A dual use guideway transportation system as of claim 8, wherein said dual use vehicle has flanged wheels on said first and second connector wheel assemblies.

10. A dual use transportation system as of claim 8, wherein said connector movement means is joined to a tie member connecting at least two said first connector wheel assemblies and a tie member connecting at least two of said second connector wheel assemblies.

11. A dual use transportation system as of claim 8, wherein said first connector wheel assembly is joined to said second connector wheel assembly by a tie member with said tie member having a pivot point providing for said wheels to rotate together in set pattern around said pivot point to engage said guide rails.

12. A dual use transportation system as of claim 8, wherein said steering coordination means has a sensing element mounted on the side of said dual use vehicle facing outward toward said guide rail with said sensing element monitoring the position of said dual use vehicle in relation to said guide rail and transfering signals to said steering coordination means that interface with said dual use vehicle's steering system to direct said dual use vehicle to steer parallel to the said guide rails.

13. A dual use transportation system as of claim 8, wherein said steering coordination system has a rod and coupling assembly that conveys movement and sequences alignment of said wheel support frame to said dual use vehicle's steering system.

14. A dual use transportation system as of claim 8, wherein the distance between the axle of said first connector wheel assembly and the axle of said second connector wheel assembly increases as said wheel assemblies are moved by said connector means to engage separate said guide rails.

15. A dual user transportation system as of claim 8, wherein the distance between the axle of said first connector wheel assembly and the axle of said second connector wheel assembly decreases as said wheel assemblies are moved by said connector means to engage separate sides of a common said guide rail.

16. A dual use transportation system as of claim 8, wherein said dual use vehicle detaches from said guide rails and said connector gear assembly moves within body of said dual use vehicle and wherein said dual use vehicle drives under its own propulsion and steering system off of the said guide way by said exit rampway system to utilize conventional roadways.

17. A dual use transportation system as of claim 8, wherein said dual use vehicle enters onto said guide way by said egress rampway system and extends said connector gear assembly outward and aligns and rollingly engages with said guide rails.

18. A dual use transportation system as of claim 8, wherein said dual use vehicle enters onto said guide way by said egress rampway system and extends said connector gear assembly by said connector member movement means outward and aligns said connector wheel assemblies with said guide rails and connector wheel movement means positions said connector wheel assemblies to rollingly engage with said guide rails.

19. A dual use transportation system as of claim 8, wherein said dual use vehicle disengages by said connector wheel movement means moving said connector wheel assemblies away from said guide rails and said connector gear assembly retracts by said connector member movement means into body of said dual use vehicle and wherein dual use vehicle drives under its own propulsion system and said steering system off of the said guide way by said exit rampway system to utilize conventional roadways.

* * * * *